United States Patent [19]
Tetrick

[11] Patent Number: 5,682,512
[45] Date of Patent: Oct. 28, 1997

[54] USE OF DEFERRED BUS ACCESS FOR ADDRESS TRANSLATION IN A SHARED MEMORY CLUSTERED COMPUTER SYSTEM

[75] Inventor: R. Scott Tetrick, Portland, Oreg.

[73] Assignee: Intel Corporation, Santa Clara, Calif.

[21] Appl. No.: 497,621

[22] Filed: Jun. 30, 1995

[51] Int. Cl.$^6$ ................................................ G06F 12/00
[52] U.S. Cl. .......................... 395/412; 395/308; 395/474
[58] Field of Search ............................ 370/85.13, 85.14; 379/219; 395/200.02, 200.03, 200.08, 200.09, 200.16, 306–308, 474–480, 412, 375, 800

[56] References Cited

U.S. PATENT DOCUMENTS

| | | | |
|---|---|---|---|
| 4,181,974 | 1/1980 | Lemay et al. | 395/200.01 |
| 4,488,232 | 12/1984 | Swaney et al. | 395/200.06 |
| 4,841,436 | 6/1989 | Asano et al. | 395/250 |
| 4,933,937 | 6/1990 | Koniski | 370/85.13 |
| 5,136,580 | 8/1992 | Videlock et al. | 370/60 |
| 5,191,649 | 3/1993 | Cadambi et al. | 395/200.05 |
| 5,235,684 | 8/1993 | Becker et al. | 395/280 |
| 5,361,390 | 11/1994 | Heyen et al. | 395/200.09 |
| 5,390,173 | 2/1995 | Spinney et al. | 370/60 |
| 5,535,340 | 7/1996 | Beir et al. | 395/292 |
| 5,560,029 | 9/1996 | Papadopoulos et al. | 395/800 |
| 5,568,620 | 10/1996 | Sarangohar et al. | 395/285 |

FOREIGN PATENT DOCUMENTS

| | | |
|---|---|---|
| 0275135 | 7/1988 | European Pat. Off. . |
| 2268859 | 1/1994 | United Kingdom . |

OTHER PUBLICATIONS

Popescu, et al., "The Meatflow Architecture", IEEE Micro, Jun., 1991, pp. 10–13 & 63–73.

*Primary Examiner*—Lance Leonard Barry
*Attorney, Agent, or Firm*—Blakely, Sokoloff, Taylor & Zafman

[57] ABSTRACT

In a shared memory computer system, processing nodes are coupled together by way of cluster bridges. A cluster bridge operating according to the present invention intercepts a global access transaction request issued from a processing node and issues a transaction deferral to indicate that the request will be serviced out-of-order. A map of global addresses which correspond to fixed addresses at the node from which the access request was issued is maintained by the cluster bridge. If the address of the global access transaction request corresponds to a fixed address local to the requesting node, the address is translated at cluster bridge and accessed at the local node in order to complete the deferred request.

16 Claims, 7 Drawing Sheets

USE OF DEFERRED BUS ACCESS FOR ADDRESS TRANSLATION IN A SHARED MEMORY CLUSTERED COMPUTER SYSTEM

BACKGROUND OF THE INVENTION

This invention relates to the addressing of shared memory in a clustered processor computer system. In particular, the invention relates to the use of a deferred bus access mechanism for the translation of global addresses in a cluster bridge interconnecting nodes in a shared memory clustered computer system.

With the increasing complexity of computer software, and increasing demands of computer users for greater processing capabilities, it is frequently desirable to construct computer systems with processing capabilities which exceed that which can be provided by a single microprocessor. One way in which the increased processing power can be achieved is to construct a multiprocessor computer system where a plurality of microprocessors reside on a common memory bus, each processor having equal shared access to the memory coupled to the bus. The processors operate concurrently and must share the use of the common bus, although memory access can be improved through the use of local memory caching for each processor.

While the common bus multiple processor architecture works well for some applications, there are certain inherent limitations to this structure, particularly when the common bus is shared between a large number of processors and when those processors are physically distant from one another. One way in which those limitations can be overcome is to employ bridge circuits coupling together a plurality of processor busses, with one or more processors residing on each bus. In this way physically distinct computer systems, such as a plurality of personal computers (PCs), can be coupled together to form a clustered processing environment. The interconnected processor subsystems, where each subsystem has a bus with one or more processors and other peripheral components, together with the bridges coupling them together are collectively referred to as a cluster. The individual processor subsystems are commonly called nodes. The clustered computer system can employ a shared memory paradigm in which memory on any node in the cluster is accessible to any other node to allow a unified and coherent computing environment to be constructed from the individual processor subsystems. Thus, the clustered computer system contrasts with a typical computer 'network', such as a local area network (LAN), wherein data sharing is permitted but not to the extent that the LAN can operate as a unified system.

In a shared memory clustered environment, fixed addresses may exist in the nodes connected in the cluster to which global access by all nodes may be required. For example, personal computers have a large block of address space that is fixed in the local memory map and is ordinarily considered private to that computer, e.g. graphics memory, and basic input/output service (BIOS) regions. Part of this address space would include access to configuration information, such as peripheral component interconnect (PCI) configuration space. In a cluster of a plurality of personal computers, each node should be able to determine the resources available to it, and would therefore require access to this configuration information in a global way. It is apparent, however, that if the nodes in the cluster are substantially identical personal computers, for example, the private address spaces for the individual nodes will overlap, creating a conflict for global access.

Accordingly, it is an object of the invention to enable uniform global access to fixed address locations from each node in a shared memory clustered environment.

BRIEF SUMMARY OF THE INVENTION

In one aspect, the present invention provides a method for data access in a shared memory clustered computer system having a plurality of processor subsystems interconnected by at least one cluster bridge. According to the method, a request for an access transaction at a global address in the clustered computer system is issued from a first processor subsystem. Identification of the global address at a first cluster bridge controller is received, and a defer indication to indicate that completion of the transaction will be deferred is issued. It is then determined whether the global address maps to a local address of said first processor subsystem and, if so, the global address is translated to the corresponding local address. Using the translated local address, an access transaction in said first processor subsystem is performed at the local address so as to obtain an access result. Finally, the deferred global access transaction is completed using the access result from the local address access.

According to another aspect of the present invention there is provided a shared memory clustered computer system comprising a first processor subsystem having a local bus at least one second processor subsystem, and a cluster bridge coupling the first processor subsystem to the at least one second processor subsystem. The cluster bridge comprises a cluster bridge controller coupled to the local bus of the first processor subsystem. The cluster bridge controller includes an address translation circuit for specifying a correspondence between predetermined global addresses in the clustered computer system and local addresses accessible on the local bus, and a bus interface circuit coupled to said local bus and said address translation circuit. The bus interface circuit provides the functionality for receiving global address access transactions on the local bus, transferring a defer indication on the local bus indicating a deferred reply transaction is required to complete the global address access transaction, and issuing a local address access transaction on the local bus during the deferred global address access.

The invention also provides a cluster bridge controller for communicating between a first node having at least one bus agent coupled to a bus and a second node, in a shared memory computer system cluster. The cluster bridge controller comprises a node interface circuit coupled, in use, to the first node bus for receiving a global address access request placed on the bus by one of the least bus agents, and transferring a defer indication onto the bus to indicate that completion of the global address access request is deferred. The cluster bridge controller also includes an address translation and control circuit for specifying a correspondence between predetermined global addresses and local addresses accessible on the first node bus, the address translation and control circuit being coupled to the node interface circuit. The cluster bridge controller also incorporates a bridge input/output circuit coupled to the address translation and control circuit and coupled, in use, for communication with the second node in the cluster. A global address received on the bus by the node interface circuit is translated to a local address by the address translation and control circuit, if the global address is one of the predetermined global addresses, and a local address access request is issued by the node interface circuit on the first node bus during the deferred global address access.

If the global address to which access is requested by the bus agent is determined by the address translation and control circuit to correspond to a local address which is accessible on the bus then the access request is translated and reissued at the local address by the node interface circuit while the global address access remains deferred. When the local address access request has been completed the node interface circuit completes the deferred global address access request by placing the results of the local address access on the bus to be received by the bus agent. If the global address to which access is requested by the bus agent does not correspond to a local address, as determined by the address translation and control circuit, then the global address access request is passed to the bridge input/output circuit for communication of the request to the second node. The result of the global address access request is received by the bridge input/output circuit and passed to the node interface circuit to enable the deferred request to be completed on the bus.

A global address access request may also be received from another cluster bridge controller by the bridge input/output circuit. In this case the global address of the request is passed to the address translation and control circuit and, if the global address corresponds to a local address of the node, a local address access request is issued on the bus using a local address corresponding to the received global address. When the local address access request has completed, the result is passed to the bridge input/output circuit for communication back to the requesting cluster bridge controller. If, on the other hand, the address translation and control circuit determines that the global address received by the bridge input/output circuit does not correspond to a local address of that node then the received global address access request can either be ignored, if the cluster bridge controller is coupled within the cluster in a parallel or cluster bus configuration, or the global address access request is passed to the next node in the series of nodes, if the cluster bridge controller is coupled within the cluster in a serial configuration.

In one form of the invention, the translation of global addresses to local addresses is achieved through the use of programmable memory ranges stored in the cluster bridge controller for indicating which global addresses require translation, and a look-up table or translation logic circuit for determining a translated local address from the corresponding global address.

BRIEF DESCRIPTION OF THE DRAWINGS

The invention is described in greater detail herein below, by way of example only, with reference to the accompanying drawings illustrating preferred embodiments of the invention, wherein.

DETAILED DESCRIPTION OF THE INVENTION

The use of deferred bus access transactions for address translation by a cluster bridge in a shared memory clustered computer system is described herein below. In the following detailed description of the invention numerous specific details are set forth, such as relating to deferred response transactions, clustered architectures and cluster bridge controllers, in order to provide a thorough understanding of the invention. However, it will be apparent to one skilled in the art that the present invention may be practiced without necessarily incorporating these specific details. In other instances, well known methods, functions, components and procedures have not been described in detail so as not to obscure the present invention.

Figure 1:
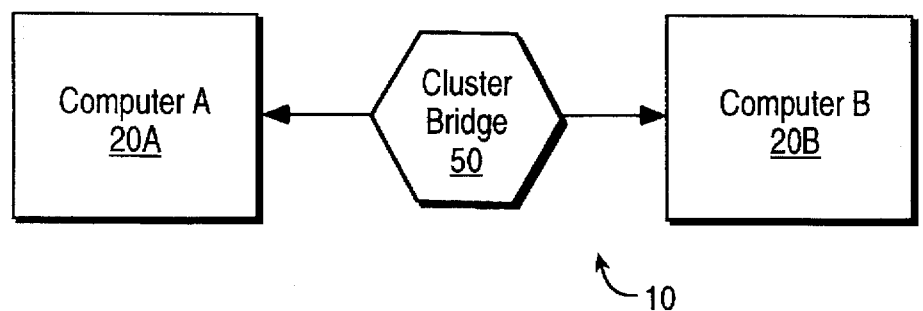
FIG. 1 is a block diagram of two processor subsystems or nodes coupled by a cluster bridge to form a computer cluster.

Referring firstly to FIG. 1, there is shown a simplified block diagram of a basic clustered computer system 10, which comprises a computer subsystem 20A and a computer subsystem 20B coupled together by way of a cluster bridge 50. A bridge is generally defined as a link between two computer subsystems. For example, an I/O bridge provides a connection between a microprocessor and an I/O subsystem. A cluster bridge provides linkage between two separate processor subsystems or cluster nodes.

Figure 2:
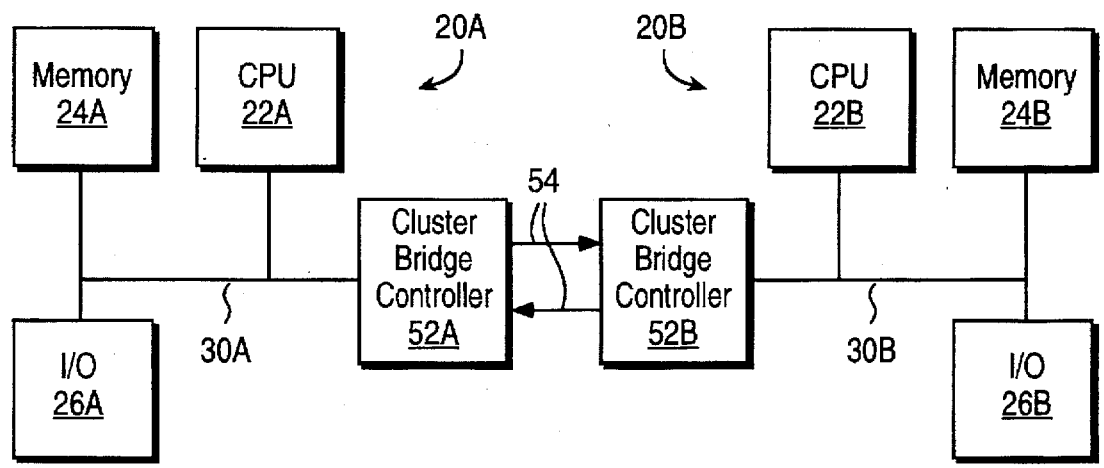
FIG. 2 is a block diagram of two nodes coupled by a cluster bridge, showing an exemplary basic structure of the nodes and cluster bridge.

A cluster bridge allows for the creation of a larger computer system constructed from the components of several smaller computer systems. For example, computer subsystems 20A, 20B may comprise independently operable personal computers (PCs) based on an Intel 486 (TM) or Pentium (TM) processor. FIG. 2 is a block diagram illustrating components of the computer cluster 10. The computer subsystem 20A comprises a bus structure 30A which is provided to allow communication between a microprocessor (CPU) component 22A, a memory component 24A and an input/output (I/O) component 26A. Those skilled in the art will recognize that FIG. 2 is merely a simplified representation of a computer architecture as may be found in a personal computer, or indeed any form of bus-based computer subsystem. The microprocessor and memory components may each include one or more levels of cache memory, and it will be recognized that the illustrated components may include various controllers and the like, such as a memory controller, a disk controller, and bus interface elements, depending upon the particular bus structure employed, as is known in the art. The computer subsystem 20B is shown comprising similar components 22B, 224B, and 26B coupled by a bus structure 30B, although it is of course not necessary that the computer subsystems coupled by the cluster bridge 50 be identical.

It is envisaged that the cluster bridge 50 may commonly be implemented by coupling respective cluster bridge controllers 52A, 52B to the bus structures 30A, 30B, and interconnecting the cluster bridge controllers 52A, 52B by communication lines 54. The cluster bridge controllers 52A, 52B may be in the form, for example, of an interface card which is provided in a slot on a computer mother-board so as to interface with the bus structure of the host computer.

In use, components connected to a bus structure 30A, 30B conduct access transactions, such as a read operation or a write operation, at a specified computer system address. The access transactions are conducted by the transmission of signals on the bus structure, such as by the transmission of a read command together with an address from which data is to be retrieved. One of the functions of a cluster bridge controller is to transmit an access transaction request to another computer subsystem in the cluster if the address involved in the transaction is not accessible from the computer subsystem bus structure to which the cluster bridge controller is coupled.

In the following description, a computer subsystem having a bus structure to which a cluster bridge controller is coupled is sometimes referred to as a cluster node, and components within the computer subsystem which am capable of requesting an access transaction on the computer subsystem bus are referred to as bus agents.

There are two primary usage models for cluster bridges. The first is generally called "message passing". In these systems, a processor writes a message to a clustered subsystem by writing to the cluster bridge. The cluster bridge sends the message to the connected processor subsystem. This results in an interrupt to a processor in the addressed subsystem. In this type of system, memory consistency, which is an important issue in multiprocessor systems, must be handled by software methods.

The second usage model relies on memory protocols to support a single shared memory image of the entire computer system. Most smaller multiprocessor systems rely on the shared memory paradigm. By using shared memory, existing operating systems can be extended with cluster bridges to form a much larger system.

Shared memory requires that accesses to a specific address be unique to a specific memory location (or I/O port for memory-mapped I/O) for the entire clustered system. While this is straightforward in a single computer system, the requirement becomes more complex for clustered systems. An example of a shared memory protocol which can be utilized is found in the IEEE Standard for Scalable Coherent Interface (IEEE Standard No. 1596). According to this standard, the cluster bridge in a clustered system is required to respond to memory accesses, determine the appropriate routing of a request, send a request to the appropriate subsystem, receive a response from the addressed subsystem, and finally respond to the requesting processor. The additional latency in some memory requests introduced by this approach results in Non-uniform Memory Access (NUMA), because the time required to respond to an arbitrary memory request is not constant, and may not in fact be bounded. Shared memory clustered bridges are therefore sometimes also referred to as NUMA bridges.

The following tables show some examples of processor, bridge and memory responses for simple scenarios.

Processor access to local memory, local memory is valid

| Sequence No. | Processor | Bridge | Memory |
|---|---|---|---|
| 1 | Processor makes memory request. | | |
| 2 | | Bridge looks up memory address and determines that the local memory contains a valid copy. | |
| 3 | | | Memory access occurs. |
| 4 | Processor completes its request with the response from memory. | | |

Processor access to non-local memory or local memory is invalid

| Sequence No. | Processor | Bridge | Memory |
|---|---|---|---|
| 1 | Processor makes memory request. | | |
| 2 | | Bridge looks up memory address and determines that the local memory contains a invalid copy. | |
| 3 | | Message is sent to location of valid memory copy. | |
| 4 | | Message is received with valid memory copy. | |
| 5 | Processor completes its request with the response from cluster bridge. | | |

Figure 3A:
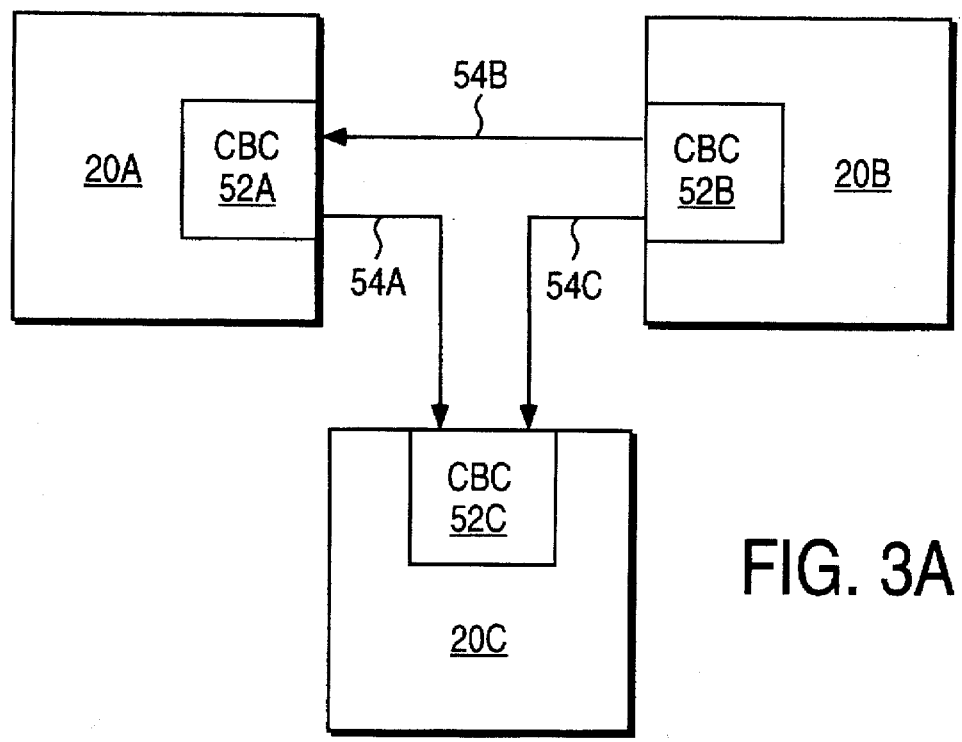
FIGS. 3A and 3B are block diagrams of clustered systems showing exemplary alternate ways of interconnecting the cluster nodes using cluster bridges.
Figure 3B:
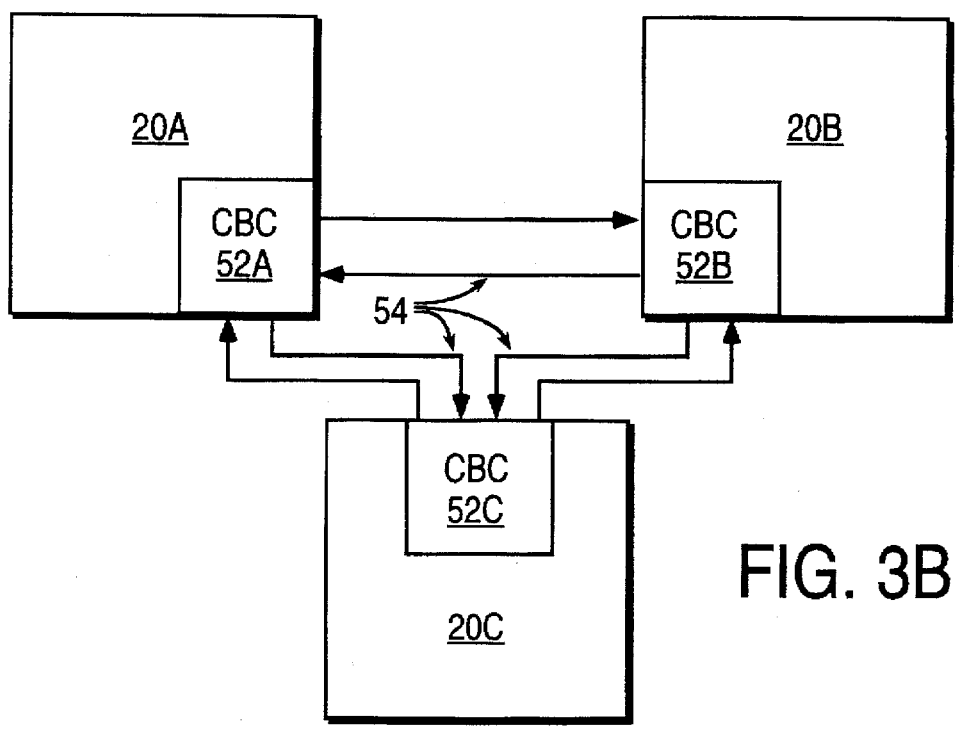

The other responsibility of a NUMA bridge is to conduct accesses to memory on the bus structure to which it is coupled, just like a processor or other bus agent. This function is required for response to requests from another cluster bridge for memory access. The IEEE 1596 specification describes the structure of a cluster bridge for maintenance of memory consistency in a shared memory clustered system. FIGS. 3A and 3B are block diagrams illustrating examples of clustered systems according to IEEE 1596, which requires that cluster bridge controllers be coupled to one another by way of point-to-point links 54. In the clustered system illustrated in FIG. 3A, three clustered computer subsystems 20A, 20B and 20C are shown, each having a respective cluster bridge controller (CBC) 52A, 52B and 52C. The cluster bridge controllers are interconnected by way of communication lines 54A, 54B, 54C, which provide point-to-point links between the clustered subsystems. In this form of clustered system, each cluster bridge controller has an input coupled to one other cluster bridge controller and an output coupled to another cluster bridge controller. In this way, the cluster nodes are connected in the form of a ring so that each node can communicate with each other node in the cluster. In the case of clusters with greater than three nodes, the connection from one node to another may be indirect, by way of another node in the cluster. As shown in FIG. 3A, node 20A is coupled via communication link 54A to pass data to node 20C; node 20C is coupled by communication link 54C to node 20B; and node 20B is coupled via communication link 54B back to node 20A.

FIG. 3B illustrates another way in which nodes having cluster bridge controllers can be coupled together so as to form a cluster. In this case, each cluster bridge controller is coupled for bi-directional communication with two other nodes in the cluster by way of communication links 54. Other ways of interconnecting nodes in accordance with IEEE 1596 are described in the IEEE specification mentioned above, and it is to be understood that the present invention is not limited to any particular configuration of cluster node interconnection.

Figure 4:
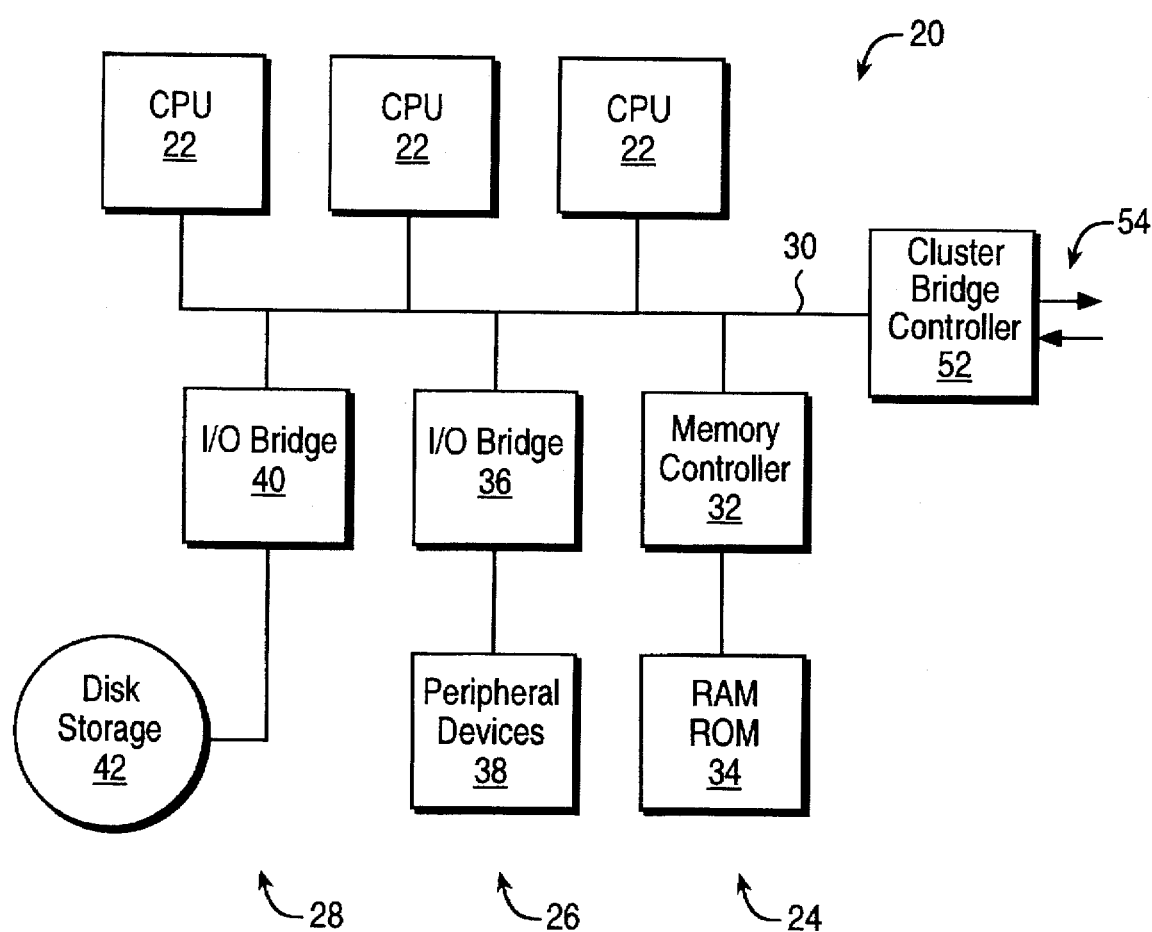
FIG. 4 is a block diagram of a cluster node processor subsystem coupled to a cluster bridge controller according to a preferred embodiment of the invention.

Referring now to FIG. 4, there is shown a block diagram of a cluster node 20 and cluster bridge controller 52 according to a preferred embodiment of the present invention. The cluster node 20 comprises a bus structure 30 to which there is coupled a plurality of bus agents and the cluster bridge controller 52. As is known in the art, the bus structure 30 may include separate communication lines comprising a memory bus, an address bus, and a control bus. The bus agents coupled to the bus structure 30 comprise a plurality of microprocessors, such as 80486 (TM) or Pentium (TM) processors, as well as a memory subsystem 24, an I/O subsystem 26 and a storage subsystem 28. The memory subsystem 24 may typically include a memory controller 32 which is coupled between the bus 30 and semiconductor memory, such as RAM and ROM memory 34. The I/O subsystem might include an I/O bridge 36 which couples peripheral devices 38, such as a keyboard and display device, to the bus 30. Another I/O bridge 40 may be utilized to provide communication between the bus structure 30 and a storage device such as a magnetic disk 42, so as to form the storage subsystem 28. The cluster bridge controller 52 is also coupled to the bus structure 30 and has I/O communication lines 54 for communicating with other cluster bridge controllers in the cluster to which the node 20 is coupled.

In operation of the present invention, devices and units in the computer system 20 perform bus transactions on the bus structure 30. The address bus and portions of the control bus of the bus structure 30 together function as a "request" bus for initiating and responding to requests. This "request" bus is used by the initiator of a request (e.g., a requesting agent, most typically one of the processors 22) to transfer the request type and address, and the same bus is used by observers (e.g., responding agents, for example the memory subsystem 24) of the request to transfer their status or response for the issued transaction. The data bus transfers data being read or written in response to the request.

In order to provide a thorough understanding of the operation of deferred bus access operations as is utilized in embodiments of the present invention, the operation of the computer system 20 is described herein below initially without reference to the cluster bridge controller 52.

Bus activity on the bus structure 30 can be hierarchically organized into operations, transactions, and phases. An operation is a bus procedure that appears atomic to software such as reading a naturally aligned memory location. Executing an operation usually requires one transaction but may require multiple transactions, such as in the case of deferred replies in which requests and replies are different transactions. A transaction is the set of bus activities related to a single request, from request bus arbitration through response-initiated data transfers on the data bus.

A transaction contains up to six phases. However, certain phases are optional based on the transaction and response type. A phase uses a particular signal group to communicate a particular type of information. In one embodiment, the six phases are:

Arbitration
Request
Error
Snoop
Response
Data

The data phase is optional and used if a transaction transfers data on the data bus. The data phases are request-initiated, if the data is available at the time of initiating the request (e.g., for a write transaction), and response-initiated, if the data is available at the time of generating the transaction response (e.g., for a read transaction).

When the requesting agent does not own the bus, transactions begin with an Arbitration Phase in which a requesting agent becomes the bus owner. After the requesting agent becomes the bus owner, the transaction enters the Request Phase, in which the bus owner drives a request, and address information on the bus. In the Request Phase a control signal is driven onto the bus along with the transaction address and sufficient information to begin snooping and memory access. This is followed by information used to identify the request (e.g., a token) and information about the length of the transaction, along with other transaction information.

The third phase of the transaction is an Error Phase, which indicates any immediate (parity) errors triggered by the request. If the transaction isn't canceled due to an error indicated in the Error Phase, a Snoop Phase is entered, four or more cycles from the Request Phase. The results of the Snoop Phase indicate if the address driven for a transaction references a valid or modified (dirty) cache line in any bus agent's cache. The Snoop Phase results also indicate whether a transaction will be completed in-order or may be deferred for possible out-of-order completion.

The Response Phase indicates whether the transaction has failed or succeeded, whether the transaction completion is immediate or deferred, whether the transaction will be retired and whether the transaction includes a Data Phase. The valid transaction responses are: normal data, implicit writeback, no data, hard failure, deferred, and retry.

If the transaction does not have a Data Phase, the transaction is complete after the Response Phase. If the request agent has write data to transfer, or is requesting read data, the transaction has a Data Phase which may extend beyond the Response Phase.

It will be understood that not all transactions contain all phases, not all phases occur in order, and some phases can be overlapped. In general, all transactions that are not canceled in the Error phase have the Request, Error, Snoop, and Response Phases. Also, arbitration may be explicit or implicit in that the Arbitration Phase only needs to occur if the agent that is driving the next transaction does not already own the bus. The Data Phase only occurs if a transaction requires a data transfer. The Data Phase can be absent, response-initiated, request-initiated, snoop-initiated, or request- and snoop-initiated. The Response Phase overlaps the beginning of the Data Phase for read transactions (request-initiated data transfers or snoop-initiated data transfers). The Request Phase triggers the Data Phase for write transactions (request-initiated data transfers).

Operations are performed on the bus 30 according to a bus protocol. The processors, memory and I/O subsystems 22,24,26,28 in the computer system 20 represent both requesting bus agents and responding bus agents. A requesting agent is a device which is capable of requesting a bus operation that involves receipt of one or more completion signals and, optionally, data from another device. A responding agent is a device which is capable of responding to the request by sending the necessary signals and, optionally, data in response to the request.

The present invention accommodates deferred transactions by essentially splitting a bus operation into two independent bus transactions. The first bus transaction involves a request (for data or completion signals) by a requesting agent, and a response by the responding agent. The request may include sending an address on the address bus. The request may also include the sending of a token, which the requesting agent uses to identify its request. The response may include the sending of completion signals (and possibly data) if the responding agent is ready to respond. In this case, the bus transaction ends, as well as the bus operation. However, if the responding agent is not ready to respond to the request (e.g., the completion signals and/or the optional data are not ready), the response may include providing an indication to the requesting agent that its response to the request will be deferred. This indication will be referred to herein as a deferral response.

In case of a deferral response, the bus operation comprises a second transaction that includes the responding agent sending a deferred reply with the completion signals and requested data (if any) to the requesting agent, such that the requesting agent completes the transaction. The deferred reply may include completion signals (and possibly data) and comparison request identifying information. The request identifying information comprises the token. That is, the token is resent by the responding agent to the requesting agent so that the requesting agent can associate the deferred reply with the original request. An example of the procedure for deferred and non-deferred bus transactions is depicted in the flow diagram of FIG. 5.

Figure 5:
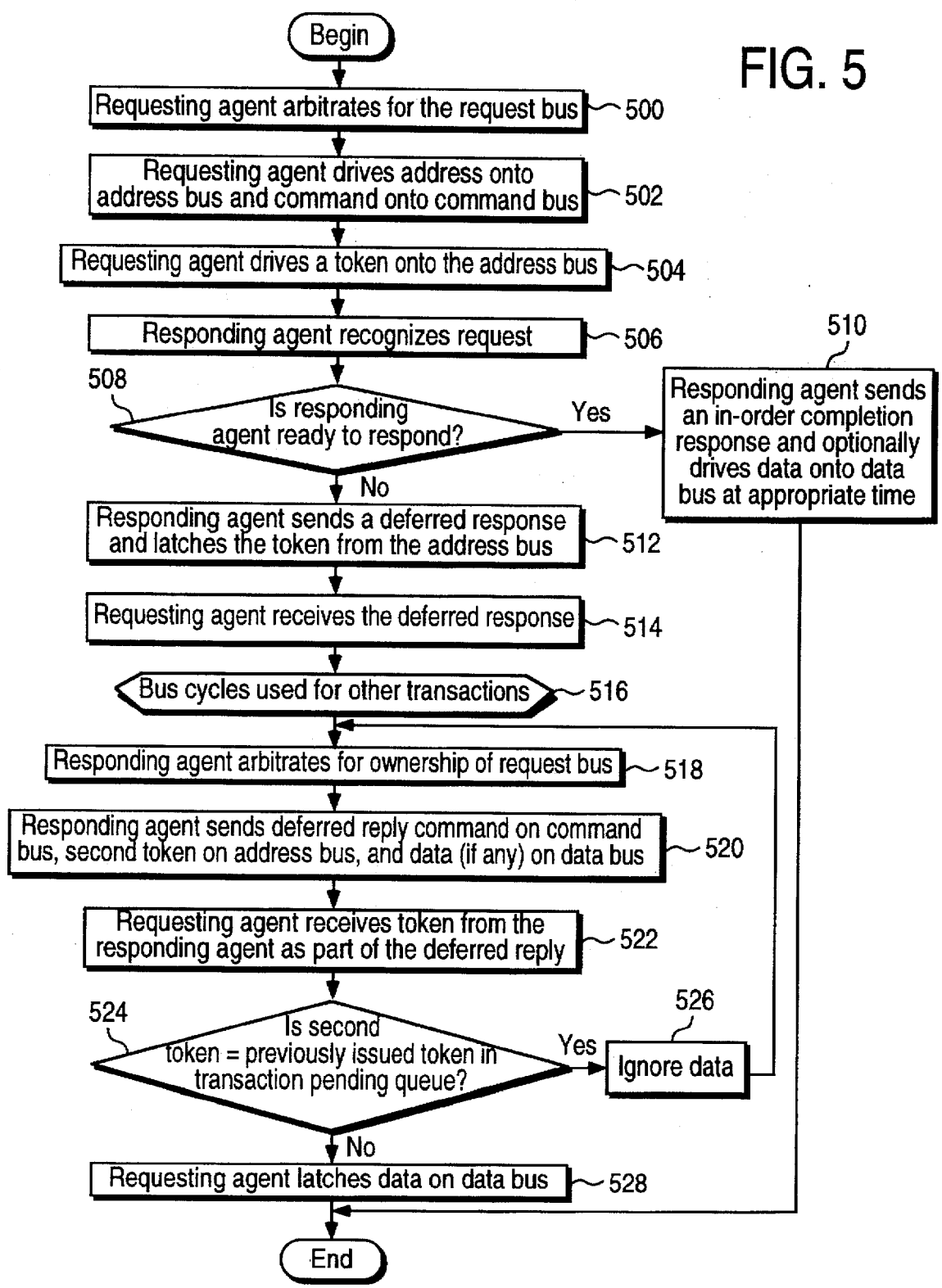
FIG. 5 is a flow diagram of operations of bus agents on a bus during an example of an implementation of a deferred response transaction.

Referring to FIG. 5, a bus transaction, deferred or non-deferred, begins when a requesting agent arbitrates for ownership of the address and control bus as used to make requests (processing block 500). Note that the control bus is used, in part, for the purposes of specifying commands, including those commands defining each bus transaction. In the present example, the requesting agent arbitrates for the address bus and drives addresses and control signals to be used to specify a command. Upon winning the arbitration, the requesting agent drives a request in the form of an address onto the address bus (processing block 502) and the requisite control signals in a manner well-known in the art, and a first token onto the address bus (processing block 504). The token is stored in a queue by the requesting bus agent, referred to as a pending request queue, with an indication of the request with which it is associated.

Once a request has been placed onto the bus, a determination of which device is to be the responding agent occurs (processing block 506). This determination includes a responding agent recognizing the address that was driven onto the address bus. For example, the responding agent may be the device which is mapped into the address space that includes the address of the request.

The responding agent then determines if it is ready to respond (processing block 508). In case of a read operation, the responding agent is ready to respond if the data requested is available. In case of a write operation, the responding agent is ready to respond if it begins completing the write operation upon receipt, or, if capable of a post write, the responding agent is ready to respond as soon as the data and address are received (where the actual writing of the data is finished later). If the responding agent is ready to respond, then the responding device sends an "in-order" completion response indication and drives the necessary signals or data on the data bus at the appropriate time (processing block 510), thereby ending the bus transaction, and the bus operation as non-deferred.

If the responding agent is not ready to complete the bus transaction, then the responding agent latches the first token from the address bus and sends a deferral response at its appropriate response time (processing block 512). The responding agent may not be ready to respond if the data is not ready by the time the responding agent is required to respond in case of a read operation. The responding agent may not be ready to respond until a write operation has been completely finished, such as in the case of a write to an I/O device.

The requesting agent receives the deferral response on the bus at the appropriate time (processing block 514). The appropriate time is dictated by the pipelined nature of the system bus, which will be described in more detail below.

The purpose of allowing deferred (out-of-order) responses to bus transactions is so that a number of additional bus transactions may be run on the bus after the requesting agent receives the deferral response and before the responding agent is finally able to satisfy the request (processing block 516). When the responding agent is ready to complete the deferred bus operation (e.g., the data does become available to the responding agent), the responding agent arbitrates for ownership of the request bus (processing block 518).

Once ownership has been granted to the responding agent, the responding agent sends a deferred reply (processing block 520). As part of the deferred reply, the responding agent sends a second token on the address bus, a deferred reply signal (e.g., command) on the control bus and any appropriate data on the data bus. Depending upon the bus protocol employed, the second token may be the same as the first token, or the first and second tokens may not be the same, yet have a unique relationship to allow bus agents to correctly associate one with the other.

The requesting agent monitors the address bus, along with other bus agents, and receives the token (processing block 522). The requesting agent latches the second token. The requesting agent then determines whether the second token sent from the responding agent matches one of the outstanding tokens in its pending request queue (processing block 524). In such a case, the requesting agent performs a token match between the second token sent from the responding agent and the first token, or any other token stored in the requesting agent. The requesting agent constantly monitors the address bus for addresses and agent IDs to determine if the signals on the address bus represent an address within the address range mapped to the agent or if the signals represent a token.

If the requesting agent determines that the second token from the responding agent does not match the first token, then the data on the data bus and the completion signal(s) are ignored (processing block 526). If the requesting agent determines that the second token from the responding agent matches the first token, then the deferred reply data on the data bus and/or the completion signals is the data or completion signals originally requested by the requesting agent and the requesting agent receives the completion signals and/or latches the data on the data bus (processing block 528), thus completing the second bus transaction. After receiving the completion signals and/or data corresponding to the original request, the entire bus operation ends. Thus, the bus transaction occurs between the responding agent and the requesting agent and the original bus operation is completed.

After a device has been determined to be the responding agent, the responding agent is responsible for generating a response to ensure that bus retains its pipelined nature. A responding agent may not be able to complete the requested bus transaction at the appropriate times. For example, the data requested may not be available. The data may not be available for numerous reasons. For example, the data may not be available due to long access times of a particular device. Also, the preparation of a response to satisfy the request may require a large number of cycles to complete due to the structure or the nature of a particular device. Therefore, in the event that the responding agent cannot complete the requested bus transaction at the appropriate times, the responding agent sends a deferral response. The responding agent sends either the requested data or completion signals (if ready to respond) or a deferred completion indication comprising a deferral response (if unable to supply the requested completion signals or the requested data) at the appropriate time.

The appropriate time for a responding agent to generate a response is defined as that time at which the responding agent must respond with some type of response in order to retain the order of the responses on the data bus with those requests that occurred on the address bus, thereby ensuring the pipelined nature of the bus. In other words, the order of the "responses" on the data bus must occur in the same order as the "requests" on the address bus. Therefore, some type of response to a particular request must appear on the data bus after the response of the request which immediately preceded the particular request on the address bus. If some type of response is not possible in a reasonable time (e.g., ten bus clocks), then all of the subsequent responses will be stalled by the agents responsible for generating them, hurting system performance.

In a shared memory clustered computer system, bus transactions are complicated by the fact that access to a specified address may not be directly available on the bus to which the requesting agent is connected. In order for a cluster of nodes to operate as a shared memory computer system, each node in the cluster should be able to address each available memory location and I/O port in the clustered system, regardless of whether the memory location or I/O port exists on the node from which access is requested (the local node) or another node in the clustered system. Thus, each node should support a global addressing system wherein each available address within the clustered system is allocated a unique global address, such that a global memory map is formed comprising the combination of all addressable locations at each node. In a clustered system in which the individual computer subsystem nodes are purposely constructed so as to be clustered together, the memory and I/O addresses can be allocated as between the individual nodes such that no overlapping of address space occurs and the individual address spaces of the cluster nodes can merely be concatenated so as to form the global address map.

Where a clustered system is to be constructed from a plurality of personal computer systems, for example, as cluster nodes, considerably more difficulty is encountered in forming a shared memory global system. In isolation, each personal computer system ordinarily utilizes an address space which extends from zero to the installed memory limit for the personal computer (e.g. 16 MB), Therefore, when a plurality of such computers are formed into nodes of a clustered computer system, a request for access to a particular address nominally addresses an equivalent location at each node in the cluster. For most addresses such conflict can be avoided by reallocating the local node addresses to addresses which are unique within the global addressing scheme. However, limitations are introduced by the personal computer system architecture which requires that certain addresses be fixed within the addressing space, such as certain memory mapped I/O addresses, graphics memory, BIOS regions, etc. Part of this fixed address space would also include access to configuration information, such as PCI configuration space. A node in such a clustered system would have to be able to determine the resources available to it, and as such, would be required to have access to this configuration information in a global way.

In order to overcome these limitations, the present invention utilizes the cluster bridge controller at a cluster node to remap addresses while an access request is deferred through out-of-order bus signaling. This allows the fixed location addresses at each cluster node to remain at their respective fixed addresses, but be allocated respective unique global addresses within the global addressing space of the cluster. Thus, when a bus agent requests access to a global address which corresponds to a fixed local address, the cluster bridge is assigned the task of translating the global address to the fixed address which is accessible on the local bus. By utilizing out-of-order bus signaling, a uniform mechanism for global accessed from any node in a cluster to particular fixed node addresses can be provided.

Figure 6:
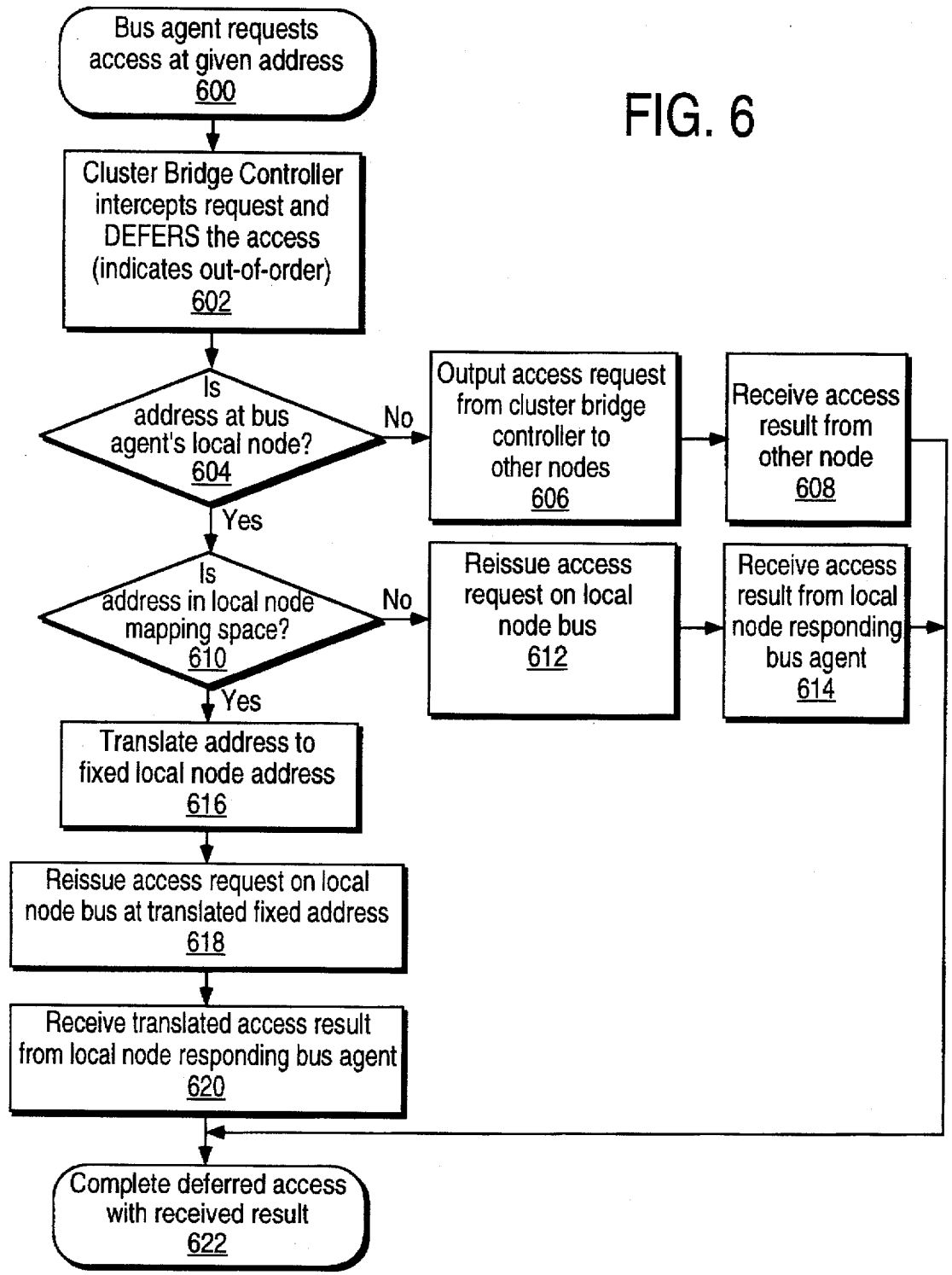
FIG. 6 is a flow diagram of operations performed at a particular node and respective cluster bridge controller according to the preferred method of the invention.

FIG. 6 is a flow diagram of operations performed at a particular node and respective cluster bridge controller according to a preferred embodiment of the present invention. At step 600 in the flow diagram of FIG. 6, a bus agent (the requesting agent) at a particular node (the local node) of a shared memory clustered computer system requests access to an address within the global addressing space of the cluster. The access request may be for the purposes of, for example, reading from or writing to a memory location or, for example, reading from or writing to an I/O port in memory mapped I/O space. The access request is achieved by the requesting agent driving signals onto the bus 30 (see FIG. 4), as described herein above. The cluster bridge controller 52 (FIG. 4) intercepts the access request on the bus 30 and sends a deferral response on the bus to indicate the access will be out-of-order (processing block 602). As described above, while the access request is deferred the local node bus is available for other bus transactions.

Meanwhile, the requested address is examined by the cluster bridge controller (processing block 604) to determine whether the requested address corresponds to a memory location or I/O port which is available on the local node bus. If it is determined that the requested address is not available on the local bus, the access request is output from the cluster bridge controller, by way of I/O communication lines 54 (FIG. 4), to other nodes in the clustered system in order to obtain a result for the access request (processing block 606). When a reply is received with an access result from another node in the cluster (processing block 608), the cluster bridge controller is then able to complete the deferred access with the received result (processing block 622), as described earlier.

If the cluster bridge controller determines that the requested address is available at the local node, a further determination is then made as to whether the requested address falls within the global address translation block for the local node (processing block 610), indicating that the requested address corresponds to a fixed address at the local node which is mapped to the global address to which access is requested. If the requested address does not require translation, the cluster bridge controller reissues the access request on the local node bus (processing block 612). When a reply to the reissued access request is received from the local node responding bus agent (processing block 614), the received access result is utilized to complete the deferred access by replying to the requesting bus agent with the access result (processing block 622).

If the cluster bridge controller determines that the requested address does fall within the global address translation block for the local node (i.e. corresponds to a local node fixed address), the cluster bridge controller employs a predetermined mapping logic scheme to translate the requested address to the corresponding actual fixed local node address (processing block 616). Using the translated fixed address, an access request is issued by the cluster bridge controller on the local bus (processing block 618) and a response with an access result is received from a local node responding bus agent (processing block 620). The cluster bridge controller then proceeds to complete the deferred access request from the requesting bus agent using the result received from the responding bus agent (processing block 622).

Figure 8:
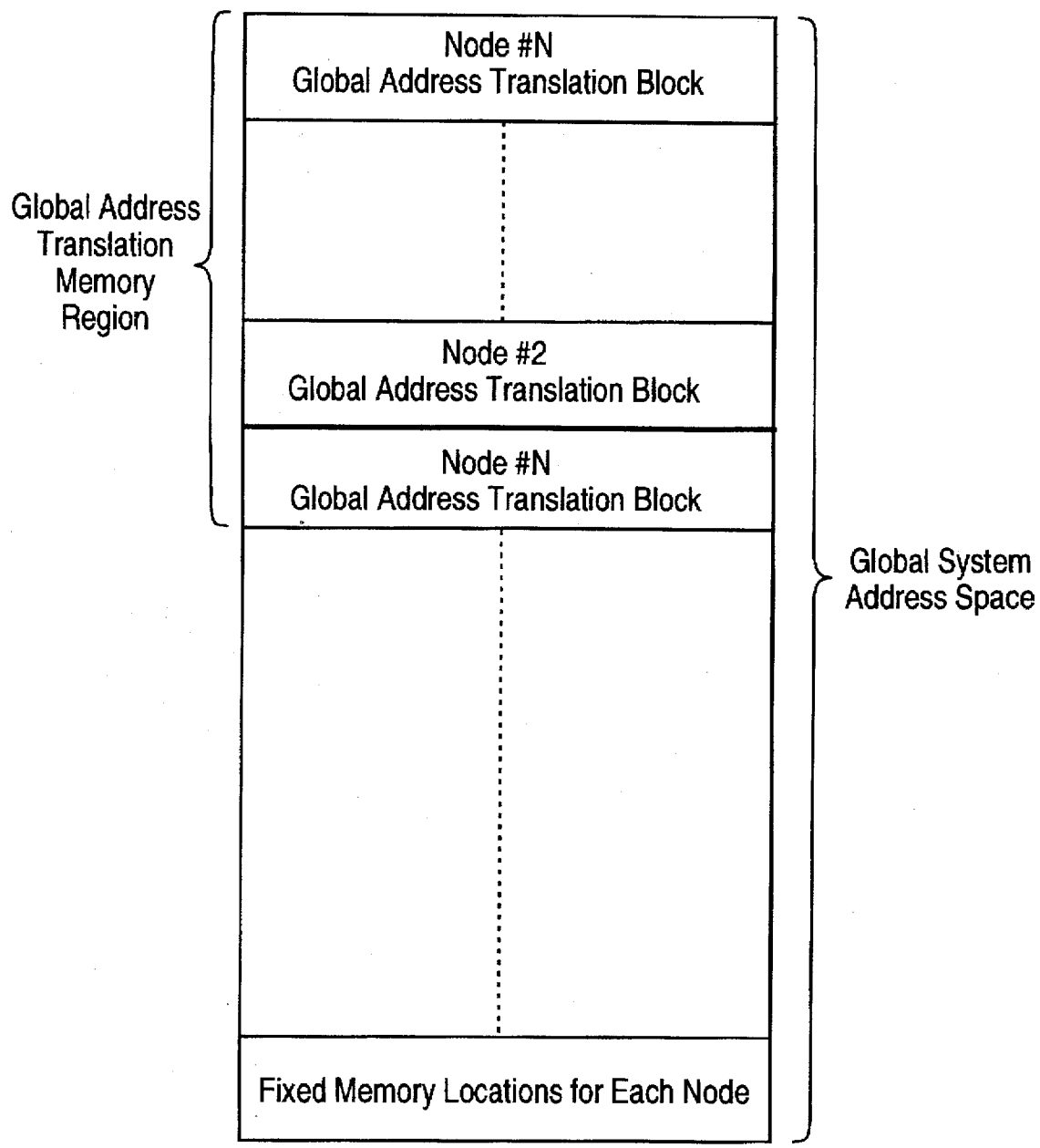
FIG. 8 is a memory map of a shared memory clustered system according to the preferred embodiment.

An example of a global address memory map in accordance with the preferred embodiment of the invention is illustrated in FIG. 8. In a shared memory clustered computer system having N individual nodes, each node is assigned a node number (node #1 to node #N). In order to prevent conflicts between the fixed memory locations at each node, the memory space containing the fixed locations, typically in the lowest portion of the address space in a PC architecture, is not included in the clustered system global address space. The remaining addresses are apportioned between the nodes in the cluster. As an example, a cluster may comprise 8 nodes and a global address space of 4 Gigabytes. Each node is allowed to support up to 512 Megabytes of addressable memory and I/O space. However, the lowest, say, 512 kilobytes are masked from the global addressing range since this is the space in which each node contains fixed address locations. In order to allow access to the fixed locations at the individual cluster nodes, each node is allocated a global address translation block which maps to the fixed address range which is masked from global addressing. In this way, the fixed local addresses for each node are provided with unique global addresses, accessible from any node in the cluster. Thus, if a request to access an address in the global address translation memory block is issued, it is possible to determine which cluster node and which fixed address location to which the access is intended.

Each cluster bridge controller in the clustered system of the preferred embodiment is provided with information of the mapping between the fixed locations at the local node to which the cluster bridge is coupled and the respective global address translation block. Preferably each cluster bridge controller also is provided with knowledge of the nodes corresponding to other global address translation blocks, if the cluster bridge architecture is such that knowledge of the node to which access is requested will aid in faster routing of the access request to the appropriate node. In one form of the invention the cluster bridge controller is provided with programmable memory ranges, for example in an address translation table memory, which allows the cluster bridge controller to ascertain that global addresses within a certain range correspond to fixed address locations at the local node, whereas global addresses within other ranges correspond to fixed location addresses at other respective nodes in the cluster. Other programmed memory ranges in the cluster bridge controller can be utilized to allow the cluster bridge controller to determine which address ranges are available (without translation) on the local bus, and which address ranges correspond to locations at other nodes in the system.

Figure 7:
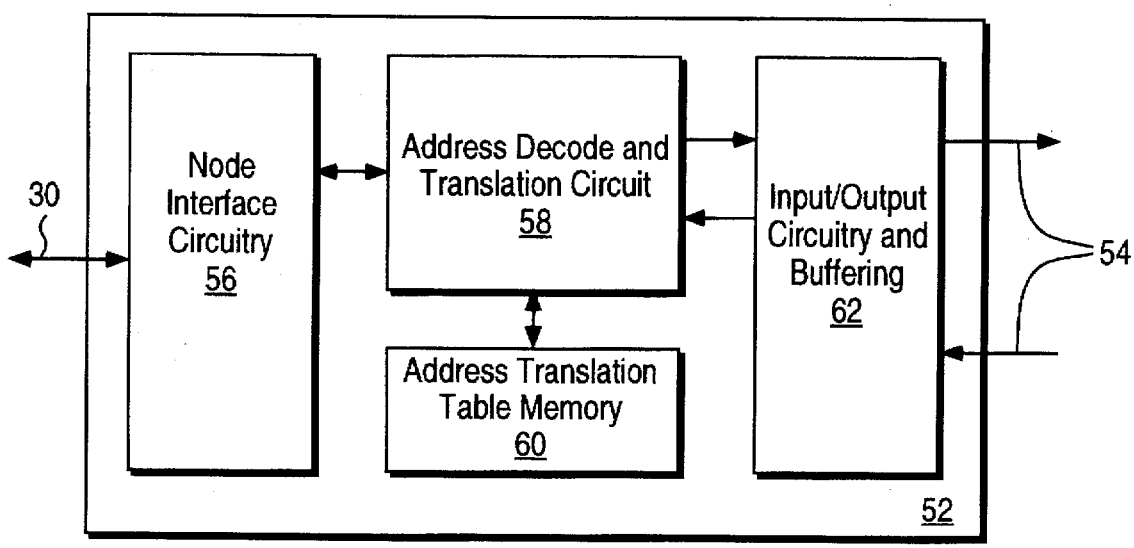
FIG. 7 is a block diagram of a cluster bridge controller of the preferred embodiment, showing the internal structure thereof.

Referring to FIG. 7, there is shown a block diagram of a cluster bridge controller 52 according to an embodiment of the invention. The cluster bridge controller 52 comprises node interface circuitry 56 for interfacing with the bus 30 of the local node to which the cluster bridge controller is coupled, input/output and buffering circuitry 62 which is coupled, in use, to a cluster bridge controller of another node by way of input and output communication lines 54, and an address decode and translation circuit 58 coupled between the node circuitry 56 and the I/O circuitry 62. The address decode and translation circuit 58 is coupled to a programmable address translation table memory 60, which is stored with the memory ranges in global address space which correspond to the fixed address spaces of the individual nodes in the cluster. It will be noted that the cluster bridge controller, through its interface to the local bus by way of the node interface circuitry, operates, in use, as both a responding bus agent and a requesting bus agent at different times during access transactions in accordance with the present invention.

During operation of the cluster bridge controller 52, the node interface circuitry 56 monitors activity on the local node bus 30, and responds to a request for access to a global address with a deferral response to indicate that the request will be processed out-of-order. The requested address is passed to the address decode and translation circuit 58, which determines whether the requested address is within the re-mapped global address space corresponding to the fixed address space for the local node, by reference to the information provided in the address translation table memory 60. If the requested address is within the global address translation block for the local node (see FIG. 8), the translation circuitry 58 utilizes the translation table memory information to translate the requested address to the corresponding fixed address for the local node, and the translated fixed address is passed back to the node interface circuitry 56. The node interface circuitry 56 then proceeds to obtain control of the bus 30 and issue a request for access to the translated fixed address, in the manner described above for deferred access transactions. When a response is received from the memory location or I/O port at the requested fixed address, the node interface circuitry then completes the deferred transaction with the results of the access request.

The purpose of the input/output and buffering circuitry 62 of the cluster bridge controller is to provide communication between the local node and other nodes coupled in the clustered system. The input and output lines 54 are coupled to respective other cluster bridge controller output and input lines, for example as shown in FIG. 3A. One function of the I/O circuitry 62 according to the present invention is to output to another node an access request which is received from a requesting agent on the local node bus and which is determined by the address decoding circuit 58 to correspond to an address which is inaccessible on the local node bus 30. When a response to the access request is received by the I/O circuitry 62, the result of the request is passed to the node interface circuitry 56, so that the deferred access can be completed by providing the requesting agent with the received request result.

The other function of the I/O circuitry 62 is to receive and respond to an access request which is output from the cluster bridge controller of another cluster node. According to one form of the invention, for example when the nodes of the cluster are coupled in a ring configuration (FIG. 3A), the address contained in an access request received by the I/O circuitry 62 is passed to the address decode circuit 58, which makes a determination of whether the requested address is accessible on the local node bus and, if not, the access request is output again from the I/O circuitry 62 to the next node in the cluster. If the requested address received by the I/O circuitry is within the local node address space then the access request is issued on the local bus 30. If the requested address falls within the global address translation block for the local node the global address is first translated to the corresponding local fixed address before the access request is issued on the local bus. When a result is received from a responding agent on the local bus 30 it is passed to the I/O circuitry 62 for transmission back to the cluster bridge controller of the node from which the request originated.

The functions of the cluster bridge controller may be implemented with a microprocessor programmed according to the procedural steps detailed above, however it is preferred that a state machine, implemented in an integrated circuit, be employed for this purpose. The bus interface signals required of the node interface circuitry, such as those indicating an out-of-order response, are dictated by the bus protocols for the computer subsystem of the local node. Similarly, the format of signals on the input and output communication lines 54 required of the I/O circuitry 62 will be necessarily in accordance with the cluster system protocols, such as outlined in the referenced specification of the IEEE 1596 Standard for Scalable Coherent Interface (SCI).

The detailed description of the present invention herein above has been presented by way of example only, and it is to be understood that the scope of the present invention and the features essential thereto is defined in the appended claims which are not to be unnecessarily limited by reference to the foregoing description of the preferred embodiments.

I claim:

1. A cluster bridge controller for communicating between a first processing node having at least one bus agent coupled to a bus and a second processing node, the cluster bridge controller comprising:

a node interface circuit coupled to said bus for receiving a global address access request placed on the bus by said at least one bus agent, and transferring a defer indication onto the bus to indicate that completion of the global address access request is deferred;

an address decode and translation circuit for specifying a correspondence between predetermined global addresses and local addresses accessible on said bus, said address decode and translation circuit being coupled to said node interface circuit; and a bridge input/output circuit coupled to said address decode and translation circuit and for communication with said second processing node;

wherein a global address received in an access request on said bus by said node interface circuit is translated to a local address by said address decode and translation circuit, if said global address is one of said predetermined global addresses, and a local address access request is issued by said node interface circuit on said bus while said global address access is deferred.

2. A cluster bridge controller according to claim 1, wherein said address decode and translation circuit includes programmable memory ranges and a comparison circuit for comparing said global address with said memory ranges to determine whether said global address is one of said predetermined global addresses.

3. A cluster bridge controller according to claim 2, wherein said address decode and translation circuit includes a translation circuit for translating said global address to a local address if said global address is within a first memory range.

4. A cluster bridge controller according to claim 2, wherein said bridge input/output circuit issues said global address in a second access request to said second node if the comparison circuit determines that said global address is within a second memory range.

5. A cluster bridge controller according to claim 2, wherein said node interface circuit issues said global address in a second access request on said bus if said comparison circuit determines that said global address is within a third memory range.

6. A shared memory cluster computer system comprising:

a first processor subsystem having a bus; at least one second processor subsystem;

a cluster bridge coupling said first processor subsystem to said at least one second processor subsystem, said cluster bridge comprising a cluster bridge controller coupled to said bus;

wherein said cluster bridge controller includes:

an address decode and translation circuit for specifying a correspondence between predetermined global addresses in said clustered computer system and local addresses accessible on said bus, and a node interface circuit coupled to said bus and said address decode and translation circuit for receiving a global address access transaction on said bus, transferring a defer indication on said bus indicating a deferred reply transaction is required to complete the global access transaction on said bus;

wherein a global address received in an access request on said bus by Said node interface circuit is translated to a local address by said address decode and translation circuit, if said global address is one of said predetermined global addresses, and a local address access request is issued by said node interface circuit on said bus while said global address access is deferred.

7. A shared memory clustered computer system according to claim 6, wherein said address decode and translation circuit includes programmable memory ranges and a comparison circuit for comparing said global address with said memory ranges.

8. A shared memory clustered computer system according to claim 7, wherein said address decode and translation circuit includes a translation circuit for translating said global address to a local address if said global address is within a first memory range.

9. A shared memory clustered computer system according to claim 7, wherein said cluster bridge controller further includes a cluster node input/output circuit, coupled to said address decoding circuit and coupled by way of communication lines to said at least one second processor subsystem, wherein an access transaction request at said global address is issued from said cluster node input/output circuit to said at least second processor subsystem if comparison circuit determines that said global address is within a second memory range.

10. A shared memory clustered computer system according to claim 6, comprising a plurality of processor subsystems each having a local bus coupled to a respective cluster bridge controller, the cluster bridge controllers of the respective processor subsystems being interconnected by way of communication lines, and each processor subsystem having a respective first address space addressable on the respective local bus and unique within a global addressing space for the clustered computer system, and a respective second address space addressable on the respective local bus and common to at least one other processor subsystem in the clustered computer system, said second address space for each processor subsystem being mapped to a unique address space for that processor subsystem within the global addressing space, and wherein data indicative of said mapping is provided to said address decoding circuit for specifying said correspondence.

11. A shared memory clustered computer system according to claim 6, wherein said first computer subsystem and said at least one second computer subsystem each comprise a personal computer.

12. A shared memory clustered computer system according to claim 11, wherein said first computer subsystem and said at least one second computer subsystem each include multiple microprocessors on a common bus.

13. A method for data access in a shared memory cluster computer system having a plurality of nodes interconnected by at least one cluster bridge, comprising the steps of:

issuing a request for a global access transaction at a global address in the clustered computer system from a first processing node;

receiving identification of the global address at a first cluster bridge controller;

issuing a defer indication to indicate that completion of the transaction is deferred;

determining whether said global address maps to a fixed address of said first processing node and, if so, translating said global address to a fixed address;

performing a local access transaction in said first processing node at said fixed address to obtain an access result; and completing said deferred global access transaction with said access result.

14. A method as claimed in claim 13, wherein the step of determining whether said global address maps to a fixed address of said first processing node includes a step of comparing, in said first cluster bridge controller, said global address with predetermined address ranges, such that if said global address is within a first address range the global address is determined to correspond to a fixed address of said first processing node.

15. A method as claimed in claim 14, including a step of determining whether said global address is within a second address range and, if so, performing said local access transaction in said first processing node at said global address.

16. A method as claimed in claim 14, including a step of determining whether said global address is within a third address range and, if so, issuing an access request at said global address to another node of said plurality of nodes in said clustered computer system.

* * * * *

UNITED STATES PATENT AND TRADEMARK OFFICE
CERTIFICATE OF CORRECTION

PATENT NO. : 5,682,512
DATED : October 28, 1997
INVENTOR(S) : R. Scott Tetrick It is certified that error appears in the above-identified patent and that said Letters Patent is hereby corrected as shown below:

In column 1 at line 44 delete "duster" and insert --cluster--

In column 5 at line 13 delete "am" and insert --are--

Signed and Sealed this

Seventeenth Day of March, 1998

*Attest:*

BRUCE LEHMAN

*Attesting Officer*    Commissioner of Patents and Trademarks